(12) United States Patent
Kikuchi

(10) Patent No.: US 10,491,045 B2
(45) Date of Patent: Nov. 26, 2019

(54) WIRELESS POWER TRANSMISSION SYSTEM

(71) Applicant: Hideo Kikuchi, Kanagawa (JP)

(72) Inventor: Hideo Kikuchi, Kanagawa (JP)

(*) Notice: Subject to any disclaimer, the term of this patent is extended or adjusted under 35 U.S.C. 154(b) by 17 days.

(21) Appl. No.: 15/776,677

(22) PCT Filed: Nov. 14, 2016

(86) PCT No.: PCT/JP2016/083736
§ 371 (c)(1),
(2) Date: May 16, 2018

(87) PCT Pub. No.: WO2017/086279
PCT Pub. Date: May 26, 2017

(65) Prior Publication Data
US 2018/0331576 A1    Nov. 15, 2018

(30) Foreign Application Priority Data

Nov. 17, 2015  (JP) ................................ 2015-225217

(51) Int. Cl.
| | |
|---|---|
| *H02J 50/12* | (2016.01) |
| *H02J 50/05* | (2016.01) |
| *H01F 27/28* | (2006.01) |
| *H01F 38/14* | (2006.01) |
| *H02J 7/02* | (2016.01) |
| *H01F 27/40* | (2006.01) |

(52) U.S. Cl.
CPC .............. *H02J 50/12* (2016.02); *H01F 27/28* (2013.01); *H01F 38/14* (2013.01); *H02J 7/025* (2013.01); *H02J 50/05* (2016.02); *H01F 2027/408* (2013.01); *H01F 2038/146* (2013.01)

(58) Field of Classification Search
None
See application file for complete search history.

(56) References Cited

U.S. PATENT DOCUMENTS

2017/0373541 A1* 12/2017 Shimokawa ............ H02J 50/12

* cited by examiner

*Primary Examiner* — Daniel Kessie
(74) *Attorney, Agent, or Firm* — Konomi Takeshita

(57) ABSTRACT

The present invention increases received electrical power received by a power receiving coil by stably increasing a resonance current in the power receiving coil of a wireless power transmission system. The present invention makes use of the wireless power transmission system comprising: a power transmitting coil for generating a magnetic field via an alternating current and a power receiving coil for generating an induced voltage via electromagnetic induction of the power transmitting coil; a power receiving resonant circuit formed by connecting a resonance capacitance to the power receiving coil; a control means for controlling in which the resonance current in the power receiving resonant circuit is matched to a target value; a power receiving coil current control circuit that is controlled by the control means and applies electrical power to the power receiving resonant circuit to increase the resonance current; and a load circuit for receiving power from the power receiving resonant circuit, wherein the power receiving coil current control circuit operates by being supplied with electrical power applied to the power receiving resonant circuit from the load circuit.

2 Claims, 7 Drawing Sheets

WIRELESS POWER TRANSMISSION SYSTEM

FIELD OF THE INVENTION

This invention concerns a wireless power transmission system in which the electric power is transferred from a power supply circuit to a load circuit through air space with wireless inducting means.

BACKGROUND OF THE INVENTION

In Patent Document 1, a wireless power transmission system that does not use a power cable or a power transmission cable is proposed. That system has a power transmitter circuit with a power transmitting coil and a power reception circuit with a resonant circuit having a power receiving coil. The power transmitting coil causes AC magnetic field and the power receiving coil causes AC magnetic field, and these fields resonates. Power is transmitted wirelessly from the power transmitting coil in the power transmitter circuit to the power receiving coil in the power reception circuit. In Patent Document 1, the power reception circuit is composed of a power receiving resonant circuit that has a power receiving coil, a rectifier circuit, and a power storage device. The AC power is received by the power receiving coil in the power receiving resonant circuit, and the AC power is rectified to DC power by the rectifier circuit to charge the power storage device.

In Patent Document 2, a wireless power transmission system in which a DC voltage conversion circuit is set between the rectifier circuit and the power storage device to match impedances, in order to improve an impedance mismatch between the power transmitter circuit and the power reception circuit caused by impedance instability of the power reception circuit. In Patent Document 2, a chopper circuit is used as the DC voltage conversion circuit, and the impedance conversion ratio is adjusted by changing the duty ratio of the pulse signal for the chopper circuit.

Patent Document 1: JP2009-106136
Patent Document 2: WO2010/035321

DISCLOSURE OF THE INVENTION

Problems that the Invention Tries to Solve

In Patent Document 1, there is a problem when the power transmitting coil and the power receiving coil in the wireless power transmission system are separated and magnetic coupling coefficient between the coils becomes small the current in the power receiving resonant circuit is insufficient. Then the power transmitting coil of the power transmitting coil supplies insufficient wireless power to the power receiving coil in the power reception circuit.

In Patent Document 2, the wireless power transmission system can convert the impedance at the load to lower impedance seen from the power receiving coil by the DC voltage conversion circuit between the rectifier circuit and the power storage device. The DC voltage conversion circuit can adjust impedance conversion ratio. By the impedance conversion, the Q factor of the power receiving resonant circuit becomes high to increase resonance current in the power receiving resonant circuit. It increases the power received by the power reception circuit.

However, in Patent Document 2, the DC voltage conversion circuit constituted of the chopper circuit has a problem that the output voltage of the chopper circuit becomes abnormal when the load resistance connected to the output terminal is large. Chopper circuits have the problem that the resonance current in the power receiving resonant circuit is not stabilized when such a problem occurs, depending on the load condition.

Therefore, the object of the present invention is to provide a wireless power transmission system in which the resonance current in the power receiving resonant circuit can be stably increased in order to increase the power received by the power receiving coil stably.

SUMMARY OF THE INVENTION

In order to achieve the aforementioned object, an aspect of the present invention is a wireless power transmission system that has a power transmitting coil that generates a magnetic field with an alternating current. The system has a power receiving coil that causes voltage induced by the current in the power transmitting coil. The system has a resonant circuit composed of a resonance capacitance and a power receiving coil. The system has a control means that adjusts the value of the resonance current on the resonant circuit to the target value. The system has a power receiving coil current control circuit that increases the resonance current by supplying power to the resonant circuit under control of the control means. The system has a load circuit that receives electric power from the resonant circuit. The power receiving coil current control circuit supplies power to the resonant circuit from the load circuit.

Effects of the Invention

The resonance current in the power receiving coil in the system according to present invention is stably increased, and the power received by the power receiving coil can be increased.

(a) is a plan view (XY-plane) showing the power receiving coil of the power reception circuit that can be seen overlapping on the power transmitting coil of the first embodiment of the present invention.

(b) is a side view (XZ-plane) showing the power transmitting coil and power receiving coil of the first embodiment of the present invention.

Figure 3A:
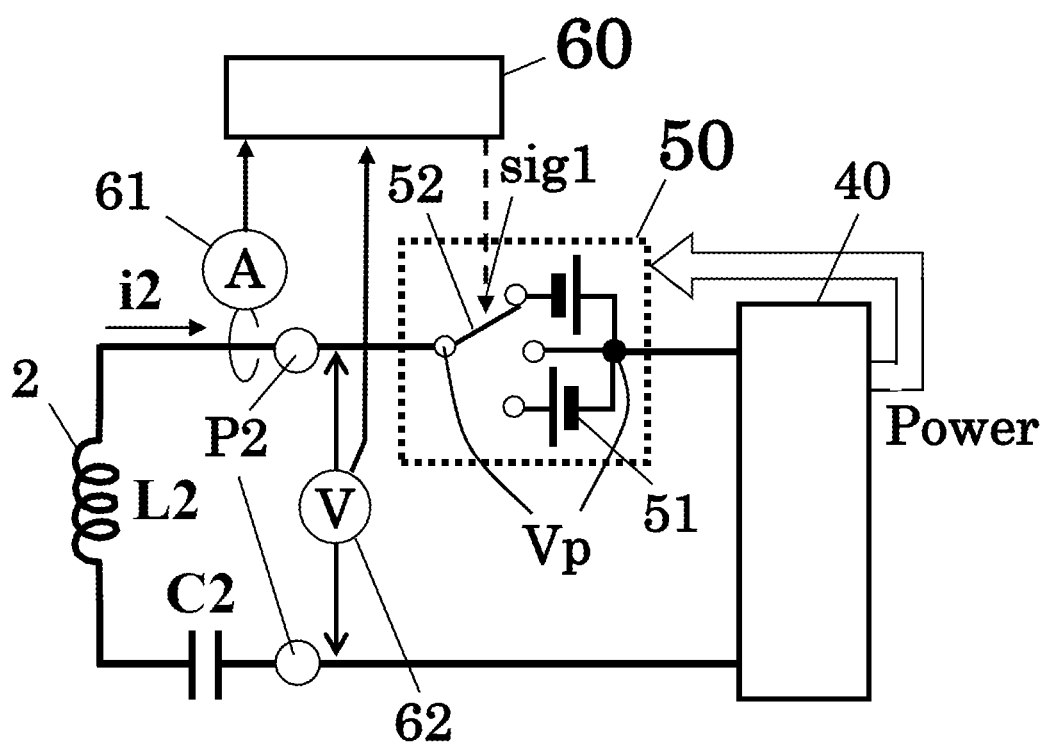

FIG. 3A is a circuit diagram showing the power receiving coil current control circuit of the power reception circuit of the first embodiment of the present invention.

Figure 3B:
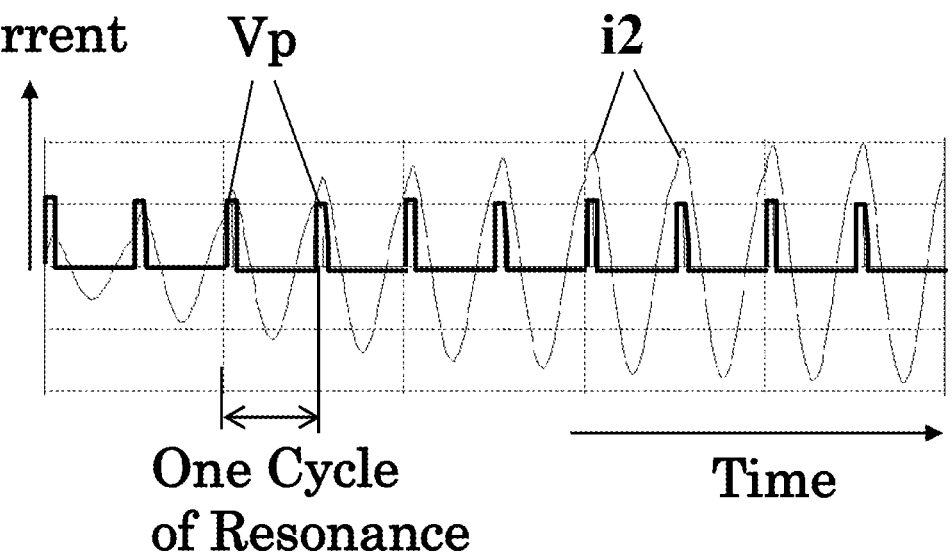

FIG. 3B is a simulation graph for resonance current i2 and pulse-like voltage waveform Vp caused by the power receiving coil current control circuit as a function of time of the first embodiment of the present invention, the pulse-like voltage waveform Vp controls the resonance current i2.

Figure 4:
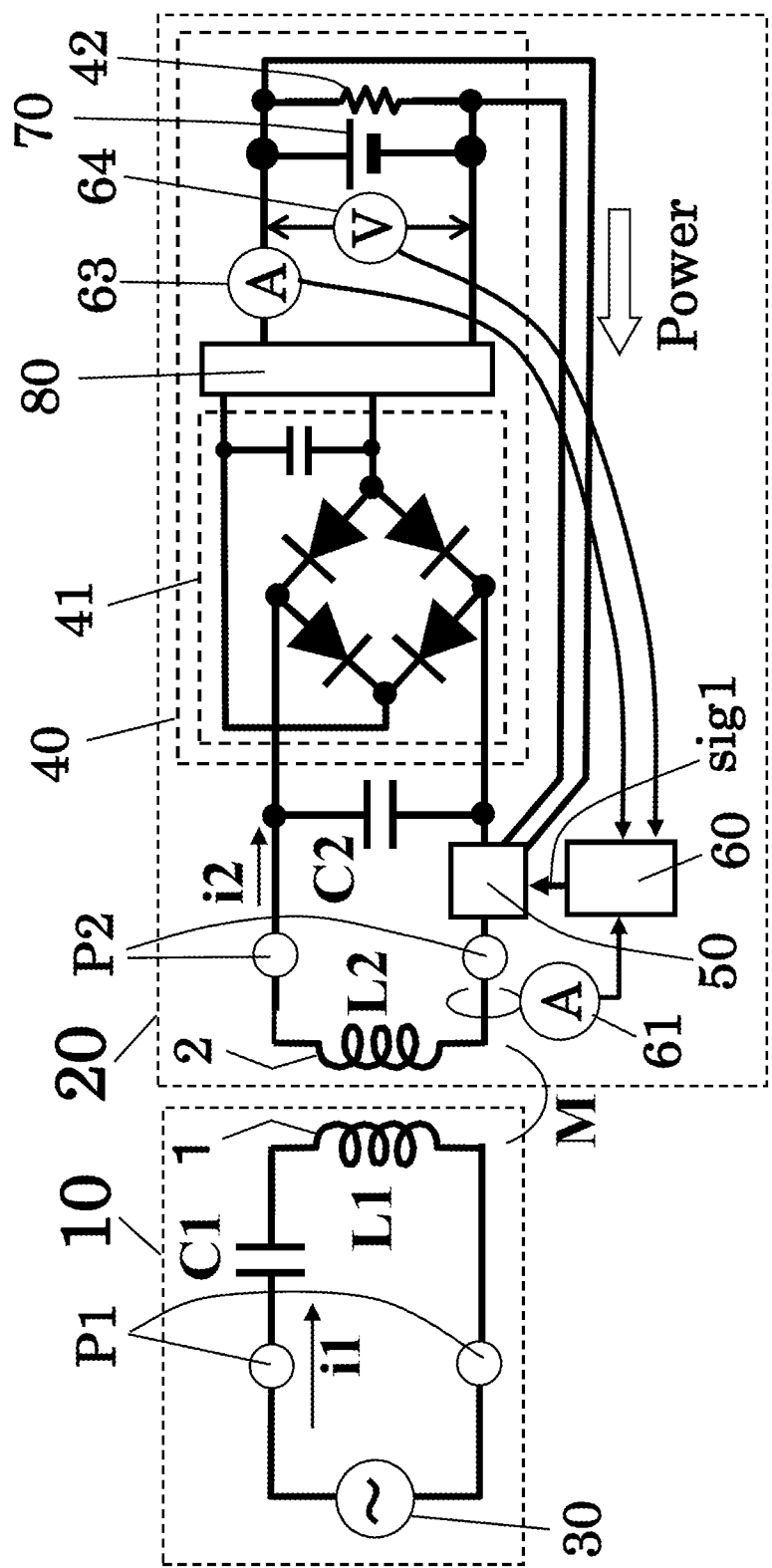

FIG. 4 is a circuit diagram showing the power transmitter circuit and the power reception circuit of the wireless power transmission system of the second embodiment of the present invention.

Figure 5:
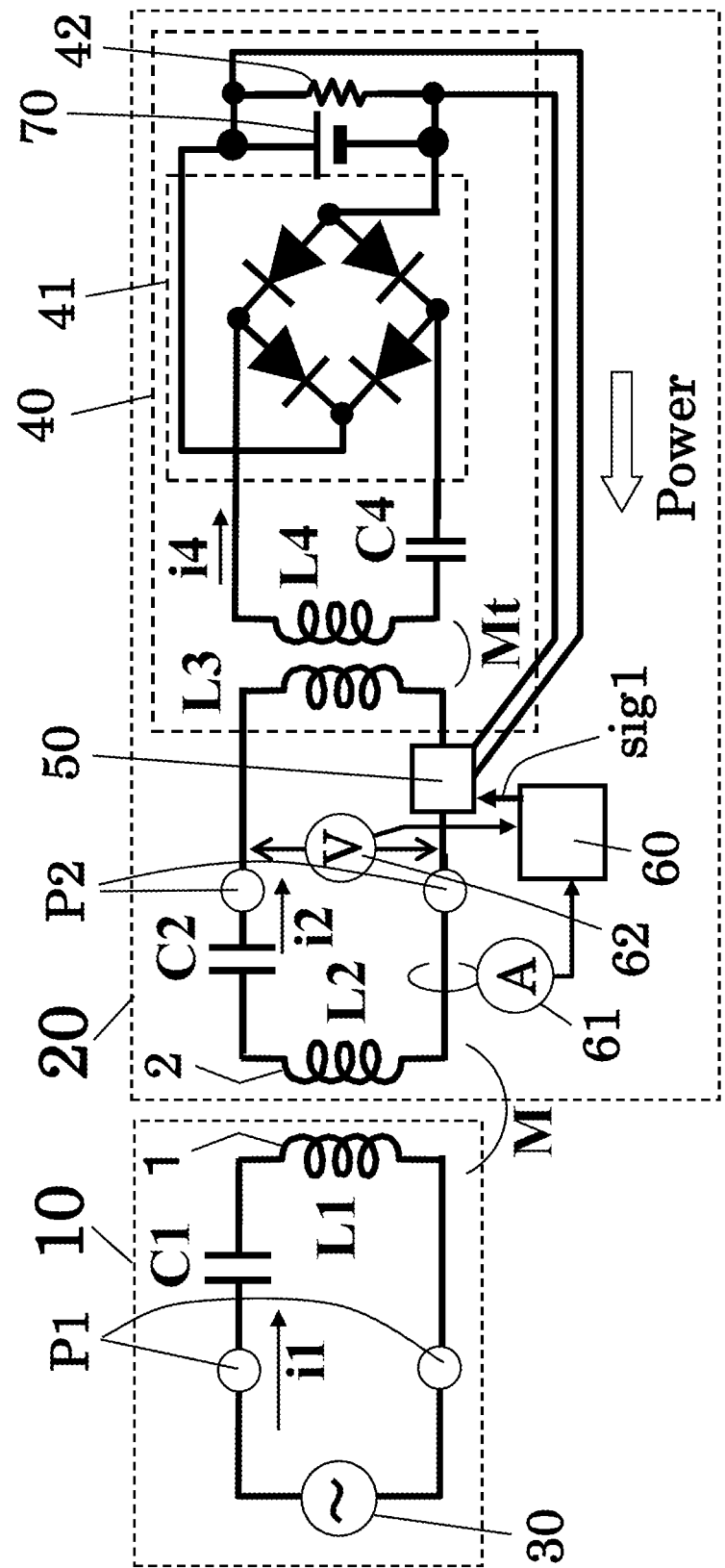

FIG. 5 is a circuit diagram showing the power transmitter circuit and the power reception circuit of the wireless power transmission system of the third embodiment of the present invention.

Figure 6:
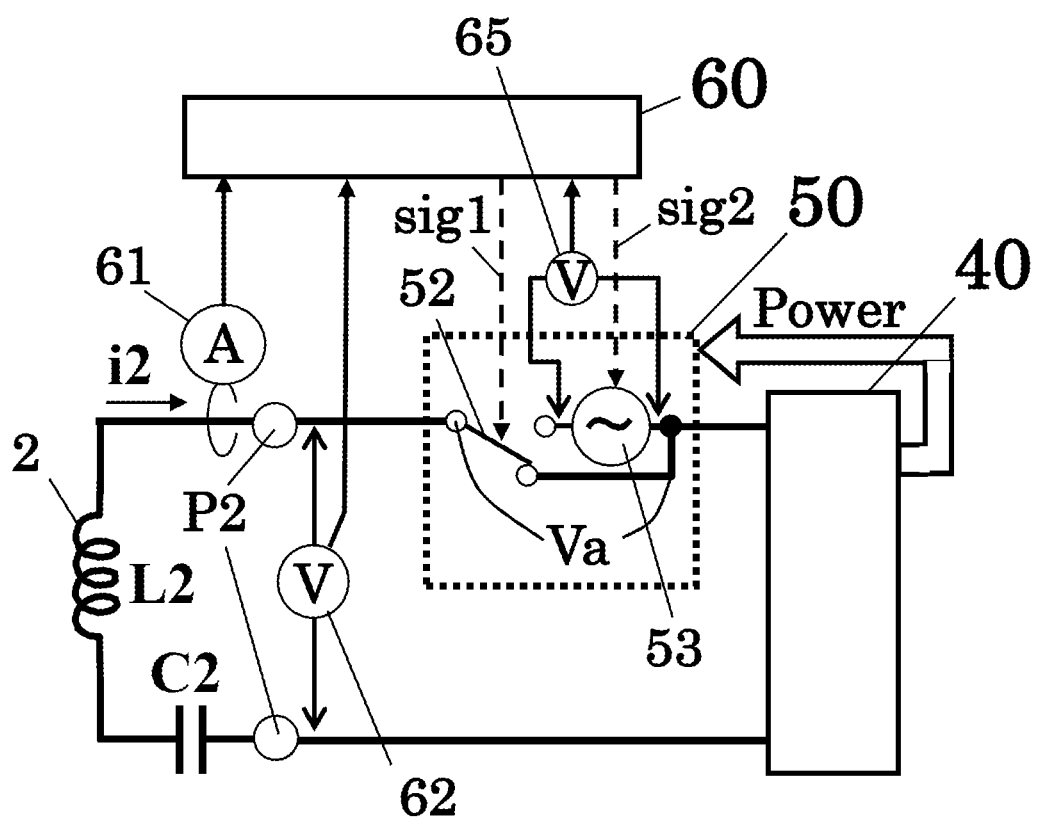

FIG. 6 is a circuit diagram showing the power receiving coil current control circuit of the power reception circuit of the fourth embodiment of the present invention.

DESCRIPTION OF REFERENCE NUMERALS

1: Power transmitting coil
2: Power receiving coil
10: Power transmitter circuit
20: Power reception circuit
30: Power supply circuit
40: load circuit
50: Power receiving coil current control circuit
51: DC drive voltage power supply
52: Semiconductor switching element
53: AC drive voltage supply
60: Control means
70: Power storage device
80: DC voltage conversion circuit
C1: Resonance capacitance
C2: Resonance capacitance
C4: Resonance capacitance
h: Coil spacing
i1: Resonance current
i2: Resonance current
i4: Resonance current
L1: Self inductance of power transmitting coil
L2: Self inductance of power receiving coil
L3: Primary coil
L4: Secondary coil
M,Mt: Mutual inductance
P1: Port 1
P2: Port 2
sig1: Switch control signal
sig2: AC frequency control signal
Va: Sine wave voltage
Vp: Pulse-like voltage waveform

DETAILED DESCRIPTION OF THE INVENTION

First Embodiment

A first embodiment will be described with reference to FIG. 1 to FIG. 3B. According to a first embodiment, a wireless power transmission system has a power transmitter circuit 10 and a power reception circuit 20. The power transmitter circuit 10 supplies the power fed by the power supply circuit 30 to the power transmitting coil 1. The power receiving coil 2 of the power reception circuit 20 receives electric power wirelessly from the power transmitting coil 1 that is set apart from the power receiving coil 2.

(Power Transmitter Circuit 10)

The power transmitter circuit 10 is composed of a resonant circuit that has a series of a power transmitting coil 1 of self inductance L1 and a resonance capacitance C1. A power supply circuit 30 is connected to port 1 (P1) that is in the middle of wiring of the power transmitting coil 1. The power supply circuit injects a resonance current i1 into the power transmitting coil 1. A constant voltage circuit or a constant current circuit can be used as the power supply circuit 30, their circuits have sufficiently low output impedance. The power transmitter circuit 10 can have a power supply circuit 30 that is connected parallel to a resonance capacitance C1.

Modified Example 1

As a modified example 1 of the power transmission circuit 10 of the present embodiment, the power transmission circuit 10 does not have a noticeable resonant circuit, in the power transmission circuit 10, only a power transmission coil 1 is directly connected to the power supply circuit 30.

(Power Reception Circuit 20)

The power reception circuit 20 has a power receiving resonant circuit that is composed of a power receiving coil of self inductance L2 and a resonance capacitance C2. A power receiving coil current control circuit 50 and a load circuit 40 are inserted in series with the power receiving resonant circuit. That is, the power receiving coil 2 in the power receiving resonant circuit has port 2 (P2) at the wiring, the power receiving coil current control circuit 50 and the load circuit 40 are set at port 2 in series. And the power reception circuit 20 has a control means 60 that controls the power receiving coil current control circuit 50.

(Wireless Power Transmission from Power Transmitting Coil to Power Receiving Coil)

Figure 2:
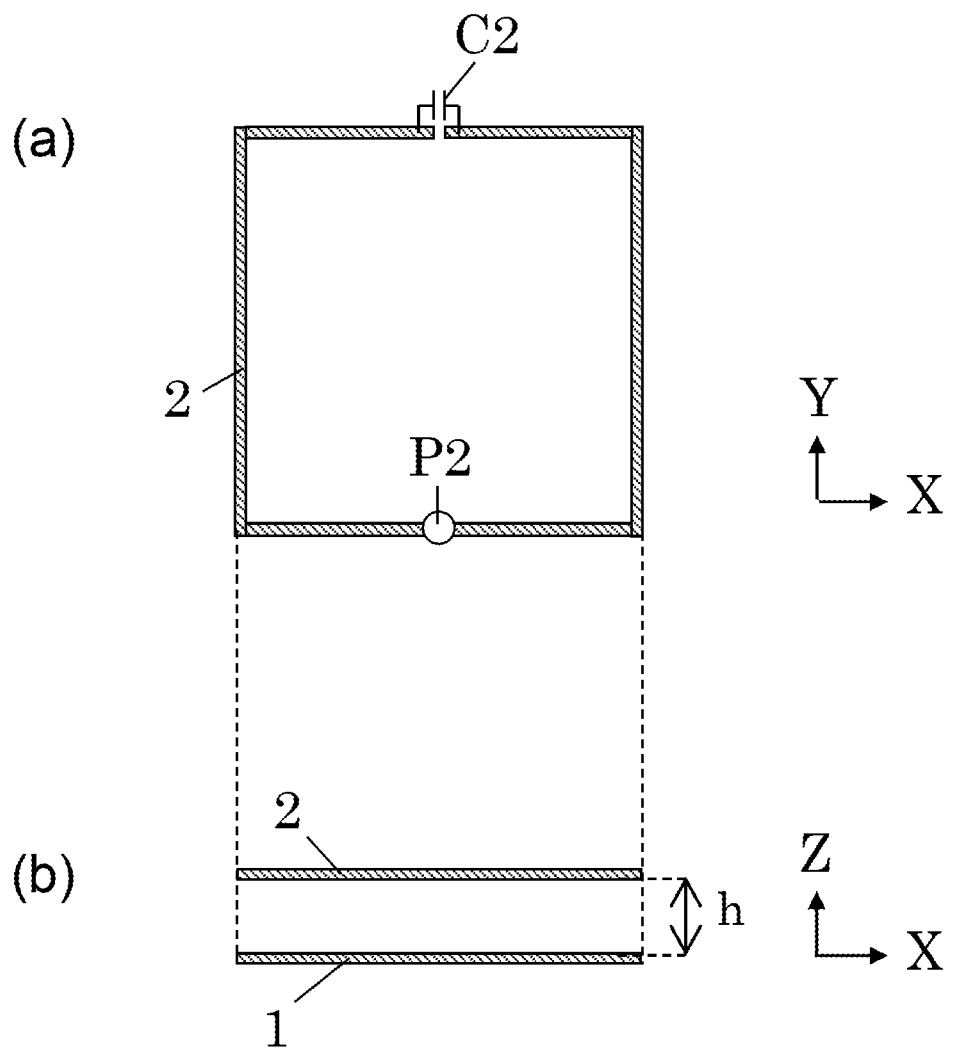
FIG. 2 shows the power transmitting coil and the power receiving coil.

In FIG. 2(*b*), shows a side view of the power transmitting coil 1 in power transmitter circuit 10, and the power receiving coil 2 in the power reception circuit 20, they are set apart facing each other. The power transmitting coil 1 and the power receiving coil are inductively coupled with mutual inductance M. Thereby, induced voltage is generated in the power receiving coil 2 by electromagnetic induction of the magnetic field generated by the power transmitting coil 1. The induced voltage resonate the power receiving resonant circuit of the power reception circuit 20 to cause the resonance current i2, whereby the power receiving coil 2 receives the wireless power from the power transmitting coil 1.

(Load Circuit 40)

The load circuit 40 has a rectifier circuit 41 and a DC voltage conversion circuit (DC/DC converter) 80 and a power storage device 70. The output power of the DC voltage conversion circuit 80 is consumed by the power storage device 70 and the load 42. The power storage device 70 supplies power to the power receiving coil current control circuit 50.

The power transmitting coil 1 supplies power to the power receiving coil 2, and the power receiving coil 2 supplies power to the load circuit 40. The rectifier circuit 41 in the load circuit 40 rectifies the resonance current i2 of the power receiving resonant circuit into a direct current. The DC voltage conversion circuit 80 converts the output voltage of the rectifier circuit 41 to the voltage for the power storage circuit 70 and charges power to the power storage circuit 70. The power storage circuit 70 supplies power to the load circuit 42 and the power receiving coil current control circuit 50.

(Control Means 60)

The control means 60 is composed of a processor such as a central processing unit of LSI of semiconductor circuits. The control means 60 receives data of measured values from the resonance current sensor 61, the AC voltage sensor 62, the charging current sensor 63 and the charge voltage sensor 64. The control means 60 controls the power receiving coil current control circuit 50 to control the resonance current i2 of the power receiving resonant circuit according to the measured values. The control means 60 also controls the DC voltage conversion circuit 80.

As shown in FIG. 3B, the control means 60 applies a pulse train of the switch control signal sig1 to the power receiving coil current control circuit 50. The switch control signal sig1 is pulsed signal that opens and closes the semiconductor switching element 52 of the power receiving coil current control circuit 50 to cause a train of pulse-like voltage waveform Vp that is applied in series to the power receiving resonant circuit.

It is recommended that the train of pulse-like voltage waveform Vp is generated in synchronization with the cycle of the AC induced voltage induced on the power receiving coil 2 by the power transmitting coil 1. The AC voltage measured by the AC voltage sensor 62 is regarded as the AC induced voltage induced onto the power receiving coil 2. The control means 60 generates a pulse train of the switch control signal sig1 in synchronization with the AC voltage measured by the AC voltage sensor 62 to apply to the power receiving coil current control circuit 50.

(Power Receiving Coil Current Control Circuit 50)

Figure 1:
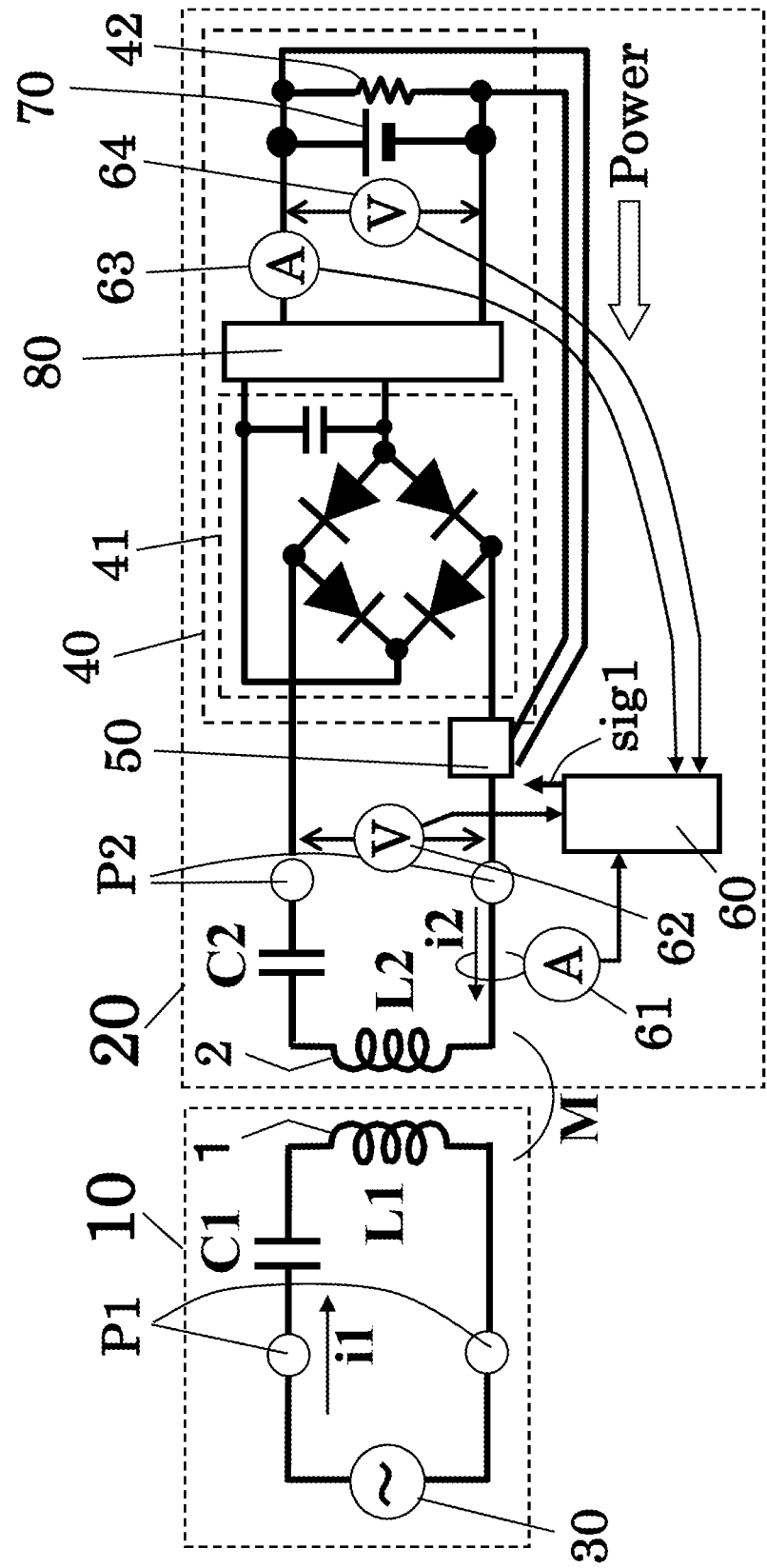
FIG. 1 is a circuit diagram showing the power transmitter circuit and the power reception circuit of the wireless power transmission system of a first embodiment of the present invention.

As shown in FIG. 1, the power receiving coil current control circuit 50 works with the power supplied by the load circuit 40. The power receiving coil current control circuit 50 is controlled by the control means 60 to apply the train of pulse-like voltage waveform Vp repeating at the same cycle as the resonance current i2 to the power receiving resonant circuit in series. Thereby, the power receiving coil current control circuit 50 controls the amplitude of the resonance current i2 in the power receiving resonant circuit (power receiving coil 2).

As shown in FIG. 3A, the power receiving coil current control circuit 50 has a DC drive voltage power supply 51 and a semiconductor switching element 52. The semiconductor switching element 52 of the power receiving coil current control circuit 50 is switched by the pulse train of the switch control signal sig1 applied by the control means 60, to apply the train of pulse-like voltage waveform Vp in series to the power receiving resonant circuit, to control the amplitude of the resonance current i2 of the power receiving resonant circuit.

It is recommended that the power receiving coil current control circuit 50 is supplied power by the power storage circuit 70 in the loading circuit 40, since output voltage of the power storage circuit 70 is stable. Alternatively, the power receiving coil current control circuit 50 can get power by other part of the load circuit 40.

The AC induced voltage induced onto the power receiving coil 2 by magnetic field generated by the current in the power transmitting coil 1 accelerates the increase rate of the resonance current i2 of the power receiving resonant circuit. The receiving coil current control circuit 50 applies the train of pulse-like voltage waveform Vp onto the power receiving coil 2. The train of pulse-like voltage waveform Vp is added to the AC induced voltage to be applied onto the power receiving resonant circuit to increase the resonance current i2 in the power receiving resonant circuit.

The increase rate of the resonance current i2 affected by the pulse-like voltage waveform Vp applied in series to the power receiving resonant circuit by the power receiving coil current control circuit 50 increases in proportion to the product of amplitude and pulse width of the pulse-like voltage waveform Vp.

(Power Flow)

The power transmitted from the power transmitting coil 1 to the power receiving coil 2 is the product of the AC induced voltage on the power receiving coil 2 induced by the power transmitting coil 1 and the resonance current i2 in the power receiving coil 2. The power receiving coil current control circuit 50 increases the resonance current i2 so that the power into the power receiving coil 2 from the power transmitting coil 1 can be increased in proportion to the resonance current i2.

On the other hand, the receiving coil current control circuit 50 sends power to the power receiving resonant circuit; the power is the product of the resonance current i2 and the pulse-like voltage waveform Vp applies on the power receiving resonant circuit by the power receiving coil current control circuit 50. When the power receiving coil current control circuit 50 increases the resonance current i2, the power received by the power receiving resonant circuit from the power receiving coil current control circuit 50 also increases in proportion to the resonance current i2.

The effect of what the power receiving coil current control circuit 50 adds the pulse-like voltage waveform Vp to the AC induced voltage generated on the power receiving coil 2 by the power transmitting coil 1 is that the power receiving coil current control circuit 50 supplies power to the power receiving resonant circuit. At the same time, the power transmitting coil 1 transfers power to the power receiving resonant circuit. That is, there are two power sources that supply power to the power receiving resonant circuit. One power source is the power transmitting coil 1 that generates the AC induced voltage on the power receiving coil 2, and another power source is the power receiving coil current control circuit 50 that applies the pulse-like voltage waveform Vp in the power receiving resonant circuit. Specifically, the DC drive voltage power supply 51 of the power receiving coil current control circuit 50 applies the pulse-like voltage waveform Vp in the power receiving resonant circuit.

(Electric Power Circulation)

While the receiving coil current control circuit 50 receives power from the power storage device 70 of the load circuit 40, the power receiving coil current control circuit 50 applies the train of pulse-like voltage waveform Vp with positive polarity to the power receiving resonant circuit to increase the amplitude of the resonance current i2 in the power receiving coil 2 to supply power to the power receiving resonant circuit. The power supplied to the power receiving resonant circuit by the power receiving coil current control circuit 50 is ultimately supplied to the power storage device 70, charging the power storage device 70. The power storage device 70 supplies power to the power receiving coil current control circuit 50 again. There is electric power circulation.

On the other hand, when the AC induced voltage on the power receiving coil 2 generated by the power transmitting coil 1 is excessive, the control means 60 controls the power receiving coil current control circuit 50 to apply the pulse-like voltage waveform Vp with negative polarity to decrease the amplitude of the resonance the current i2.

Therefore, the receiving coil current control circuit 50 reduces the resonance current i2 so that the amount of energy supplied to the power receiving coil 2 per unit time by the power transmitting coil 1, which generate the AC induced voltage on the power receiving coil 2, is reduced. The supplied energy is proportional to the resonance current i2.

In order to synchronize the resonance current i2 with the AC induced voltage on the power receiving coil 2, the power receiving coil current control circuit 50 applies a train of pulse-like voltage waveform Vp in series to the power receiving resonant circuit synchronizing to the AC induced voltage on the power receiving coil 2. That is, the timing of the pulse-like voltage waveform Vp is matched with the timing of the peak of the waveform of the AC induced voltage on the power receiving coil 2 by the power receiving coil current control circuit 50.

By the synchronization, the timing of the peak of the AC current waveform of the resonance current i2 matches the timing of the peak of the AC induced voltage waveform in the power receiving coil 2 induced by the power transmitting coil 1. And the reactive power on the power receiving coil 2 received from the power transmitting coil 1 is set to 0. That is, the product of the induced voltage on the power receiving coil 2 and the resonance current i2 in the power receiving coil 2 is controlled to only active power.

Referring to FIG. 3A, the circuit configuration of the power reception coil current control circuit 50 will be described in detail. And referring to FIG. 3B, the operation of the circuit that controls the resonance current i2 will be described in detail. FIG. 3A shows a part of circuit configuration of the power reception circuit 20, the power receiving resonant circuit, the control means 60, and the power receiving coil current control circuit 50. FIG. 3B shows a graph for the resonance current i2 as a function of time. The graph is a result given by simulation of the power reception circuit 20.

The power receiving resonant circuit is composed of the power receiving coil 2 and the resonance capacitance C2. The power receiving coil current control circuit 50 switches the semiconductor switching element 52 to connect the DC drive voltage power supply 51 to the power receiving resonant circuit, so that the pulse-like voltage waveform Vp is applied in series to the power receiving resonant circuit.

The control means 60 synchronize the train of pulse-like voltage waveform Vp generated by the semiconductor switching element 52 with the AC voltage measured by the AC voltage sensor 62 by sending a pulse train of the switch control signal sig1 to the semiconductor switching element 52. As a result, the timing of the peak of the AC current waveform of the resonance current i2 matches the timing of the train of pulse-like voltage waveform Vp.

(Control of Resonance Current)

When the AC induced voltage on the power receiving coil 2 generated by current in the power transmitting coil 1 is low, the resonance current i2 gently increases by the AC induced voltage. Then the pulse-like voltage waveform Vp is higher than the AC induced voltage on the power receiving coil 2. Then, the control means 60 controls the power receiving coil current control circuit 50 to add a train of pulse-like voltage waveform Vp with positive polarity onto the AC induced voltage on the power receiving coil 2. The train of pulse-like voltage waveform Vp accelerate the rate of increase of the resonance current i2. As a result, as shown in FIG. 3B, the resonance current i2 is quickly increased to a predetermined steady current.

(Use of Sensors)

The control means 60 receives data of the current waveform of the resonance current i2 measured by the resonance current sensor 61. The control means 60 stops to apply the train of pulse-like voltage waveform Vp on the power receiving resonant circuit when the measured value of the amplitude of the resonance current i2 reaches the target value, so that the resonance current i2 is maintained at the target value.

When the resonance current i2 exceeds the target value, the control means 60 controls the power receiving coil current control circuit 50 to apply the train of pulse-like voltage waveform Vp in series to the power receiving resonant circuit with negative polarity in which the train of pulse-like voltage waveform Vp decreases the resonance current i2, so that the resonance current i2 is maintained at the target value.

In this way, the control means 60 adjusts the amplitude of the resonance current i2 in the power reception circuit 20 by adjusting the time while the power receiving coil current control circuit 50 applies the train of pulse-like voltage waveform Vp in series to the power receiving resonant circuit in the power reception circuit 20. Thereby, the resonance current i2 in the power receiving coil 2 in the power reception circuit 20 can be stabilized.

In the case that the control means 60 increases the target value of the resonance current i2 and controls the power receiving coil current control circuit 50 to increase the resonance current i2, a large power from the power transmitting coil 1 that is a product of the resonance current i2 and the AC induced voltage on the power receiving coil 2 is received by the power receiving coil 2. Thereby, the power received by the power receiving coil 2 can be increased.

(DC Voltage Conversion Circuit)

In the present embodiment, a DC voltage conversion circuit (DC/DC converter) 80 is used. The DC voltage conversion circuit 80 converts the DC voltage that the rectifier circuit 41 generates by rectifying the resonance current i2 into different voltage. The DC voltage conversion circuit 80 is composed of a step-up converter that changes the step-up ratio of the voltage by changing the pulse width of the control pulse signal applied to the step-up converter from the control means 60.

In the present embodiment, by connecting the rectifier circuit 41 in series with the power receiving resonant circuit, the output voltage of the rectifier circuit 41 is about the amplitude of the AC induced voltage on the power receiving coil 2, the output voltage is low. Therefore, the DC voltage conversion circuit 80 boosts the output voltage, the low output voltage of the rectifier circuit 41 is boosted to a high voltage to supply to the power storage device 70 and the load 42 to consume the power.

The step-up ratio of the output voltage of the DC voltage conversion circuit 80 that is composed of the step-up converter is controlled by the pulse width of the control pulse signal applied to the step-up converter from the control means 60. The control pulse signal switches current switches in the step-up converter.

The output voltage of the DC voltage conversion circuit 80 constituted by a step-up converter becomes abnormal when no current and power is drawn from it to the power storage device 70 and the load 42. In this embodiment, the power receiving coil current control circuit 50 draws power from the DC voltage conversion circuit 80 by connecting the output terminal of the step-up converter that constitutes the DC voltage conversion circuit 80 to the input terminal of the power receiving coil current control circuit 50. The output terminal and the input terminal are connected in parallel to the terminal of the power storage device 70. Since the power receiving coil current control circuit 50 consumes moderately the power of the DC voltage conversion circuit 80, there is an effect that the output voltage of the DC voltage conversion circuit 80 can be maintained in a normal state.

(Example 1 of Controlling Resonance Current i2)

As described below, the control means 60 controls the power receiving coil current control circuit 50 to stabilize the power received by the power receiving coil 2. As an example, when voltage on the power receiving coil 2 induced by the current in the power transmitting coil 1 changes due to shift of the position of the power receiving coil 2 facing the power transmitting coil 1, it controls the power received by the power receiving coil 2 to be kept constant, as described below.

First, the control means 60 sets the target value of power received by the power receiving coil 2 from the power transmitting coil 1. That is, a target value of the product of the voltage induced on the power receiving coil 2 and the resonance current i2 is set.

Next, the resonance current sensor 61 measures the resonance current i2, and the AC voltage sensor 62 measures the AC voltage induced on the power receiving coil 2, then, the control means 60 calculate the target value of the resonance current i2 by dividing the target value of the power received by the power receiving coil 2 by the measured value of the induced voltage.

Then, the control means 60 controls the power receiving coil current control circuit 50 to maintain the resonance current i2 at the target value. That is, when voltage induced on the power receiving coil 2 by the power transmitting coil 1 is small, the resonance current i2 is controlled to increase. And when the voltage induced is large, the resonance current i2 is controlled to decrease. As a result, when the voltage induced on the power receiving coil 2 changes, the power received by the power receiving coil 2 that is the product of the voltage induced and the resonance current i2 is controlled to be kept constant.

At the same time, the output voltage of the rectifier circuit 41, which is about the induced voltage, is converted into an appropriate voltage to be supplied to the power storage device 70 and the load 42 in parallel by the DC voltage conversion circuit 80 constituted by the step-up converter. The control means 60 adjusts the step-up ratio of the output voltage of the DC voltage conversion circuit 80 to an appropriate step-up ratio by changing the pulse width of the control pulse signal applied to the step-up converter.

(Example 2 of Controlling Resonance Current i2)

In the case where the voltage induced on the power receiving coil 2 by the power transmitting coil 1 is constant, when there is a needs to receive more power by the power receiving coil 2, the control means 60 controls the power receiving coil current control circuit 50 to control the resonance current i2 to a larger value, so that the power received by the power receiving coil 2 that is the product of the induced voltage and the resonance current i2 increases.

(Example 3 of Controlling Resonance Current i2)

The resonance current i2 in the power receiving coil 2 may sometimes cause the resonance current i2 larger than steady current at a time before the time when the current reaches a steady state, due to the influence of the load circuit 40. In that case, the control means 60 controls the power receiving coil current control circuit 50 to suppress the resonance current i2 by applying the pulse-like voltage waveform Vp with negative polarity which decreases the resonance current i2, and sets the resonance current i2 to be the target value, so that the resonance current i2 is stabilized.

(Example 4 of Controlling Resonance Current i2)

As the power storage device 70 is charged, the necessity of electric power to be charged into the power storage device 70 per unit time changes with the lapse of time. Therefore, the charge voltage of the power storage device 70 is measured by the charge voltage sensor 64, and the control means 60 changes the target value of the power received by the power receiving coil 2 according to the charge voltage of the power storage device 70. And the control means 60 controls the power receiving coil current control circuit 50 to control the power to charge the power storage device 70 to an appropriate value at each time.

In this way, the control means 60 controls the power receiving coil current control circuit 50 to increase or decrease the resonance current i2 to control freely the resonance current i2, whereby the power received by the load circuit 40 is freely controlled, where the power received is the product of the resonance current i2 and the voltage induced on the power receiving coil 2.

Second Embodiment

Second embodiment of the present invention will be described with reference to FIG. 4. The second embodiment is different from the first embodiment in that the load circuit 40 in the power reception circuit 20 is connected to the resonance capacitance C2 in parallel as shown in FIG. 4. The power transmitter circuit 10 is similar to that in the first embodiment.

(Power Reception Circuit 20)

According to the second embodiment, the power reception circuit 20 has a power receiving resonant circuit that is composed of a resonance capacitance C2 and a power receiving coil 2 of self inductance L2, and the power receiving coil current control circuit 50 is inserted in series with the power receiving resonant circuit as shown in FIG. 4. Both ends of the power receiving coil 2 are set to port 2 (P2). A resonance capacitance C2 and a power receiving coil current control circuit 50 connected in series are connected to the port 2. And the load circuit 40 is connected to the both ends of the resonance capacitance C2 in parallel.

Similarly to the side view of FIG. 2(b), the power transmitting coil 1 of the power transmitter circuit 10 and the power receiving coil 2 of the power reception circuit 20 are set apart facing each other, and both coils are inductively coupled with each other by mutual inductance M. Thereby, AC induced voltage is generated in the power receiving coil 2 by electromagnetic induction of the magnetic field generated by current in the power transmitting coil 1. The AC induced voltage generates the resonance current i2 in the power receiving resonant circuit of the power reception circuit 20.

(Load Circuit 40)

The load circuit 40 is connected in parallel to the resonance capacitance C2. The load circuit 40 consumes the electric power charged in the resonance capacitance C2. The current flowing from the resonance capacitance C2 to the load circuit 40 is rectified to direct current by the rectifier circuit 41. The output voltage of the rectifier circuit 41 is converted by the DC voltage conversion circuit 80, the output voltage of the DC voltage conversion circuit 80 charges the power storage device.

The voltage applied to the resonance capacitance C2 is high that is the voltage input to the load circuit 40 connected in parallel to the resonance capacitance C2, and the output voltage of the rectifier circuit 41 of the load circuit 40 is high about the voltage of the resonance capacitance C2.

Since the output voltage of the rectifier circuit 41 is high, the output voltage is converted to a low voltage by the DC voltage conversion circuit 80 and supplied to the power storage device 70 and the load 42.

(Control Means 60)

The control means 60 receives the signals from the resonance current sensor 61, the charge current sensor 63, and the charge voltage sensor 64.

As in the first embodiment, the control means 60 controls the receiving coil current control circuit 50 by sending a pulse train of the switch control signal sig1 to the semiconductor switching element 52 of the receiving coil current control circuit 50 to open and close the switch element 52. Thereby, a train of pulse-like voltage waveform Vp is generated, and the train of pulse-like voltage waveform Vp is applied in series to the power receiving resonant circuit.

It is preferable that the train of pulse-like voltage waveform Vp is generated in synchronization with the cycle of the AC induced voltage on the power receiving coil 2 induced by current in the power transmitting coil 1. The alternating resonance current i2 in the power receiving resonant circuit is considered to be synchronized with the AC induced voltage and be in phase with it. Then, the pulse train of the switch control signal sig1 to the receiving coil current control circuit 50 is synchronized with the current waveform of the resonance current i2 measured by the resonance current sensor 61.

(DC Voltage Conversion Circuit 80)

When the receiving coil current control circuit 50 changes the resonance current i2 in order to change the power received by the power receiving coil 2, the voltage of the resonance capacitance C2 changes in proportion to the resonance current i2. As a result, the output DC voltage of the rectifier circuit 41 of the load circuit 40 changes to a value about the amplitude of the resonance capacitance C2. The DC voltage conversion circuit 80 converts the DC output voltage of the rectifier circuit 41 to supply a constant voltage on the power storage device 70 and the load 42.

The DC voltage conversion circuit 80 is constituted by a step-down converter that is controlled the step-down ratio of the output voltage by the pulse width of the control pulse signal applied by the control means 60.

The output voltage of the DC voltage conversion circuit 80 constituted by a step-down converter becomes abnormal when no current and power is absorbed by the power storage device 70 and the load 42. In this embodiment, the output terminal of the step-down converter is connected to the power storage device 70, the power storage device 70, and the power receiving coil current control circuit 50 that consumes electric power. Since the power receiving coil current control circuit 50 consumes moderately the power of the DC voltage conversion circuit 80, there is an effect that the output voltage of the DC voltage conversion circuit 80 can be maintained in a normal state.

As in the first embodiment, this embodiment also adjusts the time during which the power receiving coil current control circuit 50, which is controlled by the control means 60, continuously applies the train of pulse-like voltage waveform Vp to the power receiving resonant circuit in series, whereby the power receiving resonance current i2 of the power receiving resonant circuit is adjusted to the target value.

Modified Example 2

As a second modified example of the present embodiment, in the case that the control means 60 controls the receiving coil current control circuit 50 to control the resonance current i2 to a constant value, the amplitude of the AC voltage of the resonance capacitance C2 and the output DC voltage of the rectifier circuit 41 are maintained to a constant value, respectively. In that case, a simple circuit in which the step-down ratio of the voltage is always fixed to a constant value can be used as the DC voltage conversion circuit 80.

(Example 5 of Controlling Resonance Current i2)

In the present embodiment, when the voltage on the power receiving coil 2 induced by current in the power transmitting coil 1 changes, the power received by the power receiving coil 2 can be controlled to be kept constant as described below.

First, the control means 60 sets a target value of power charged in the power storage device 70. The target value of the power charged in the power storage device 70 is set to be larger than the target value of the power received by the power receiving coil 2, which is the product of the voltage induced on the power receiving coil 2 and the resonance current i2, by the amount of circulating power used by the receiving coil current control circuit 50 supplying to the power receiving resonant circuit, which is supplied from and returned to the load circuit 40.

Next, the resonance current sensor 61 measures the resonance current i2. The charging current sensor 63 measures the charging current for charging the power storage device 70. The charging voltage sensor 64 measures the voltage charged in the power storage device 70.

The control means 60 calculates the value of the product of the charging voltage measured by the charging voltage sensor 64 and the charging current measured by the charging current sensor 63 and stores that value in memory as a measured value of the charging power. The control means 60 divides the target value of the charging power by the measured value of the charging power. And the control means 60 multiplies the divided value to the value of the resonance current i2 measured by the resonant current sensor 61. The control means 60 set the multiplied value to the target value of the resonance current i2.

Then, the control means 60 controls the power receiving coil current control circuit 50 to control the resonance current i2 to match the target value. That is, when the AC induced voltage on the power receiving coil 2 induced by the power transmitting coil 1 is small, the resonance current i2 is controlled to increase, and when the induced voltage is large, the resonance current i2 is controlled to decrease, so that power received by the power reception circuit 20 can be controlled to be kept constant.

On the other hand, the output DC voltage of the rectifier circuit 41 changes according to the amplitude of the resonance current i2. The output DC voltage of the rectifier circuit 41 is converted to a predetermined voltage by the DC voltage conversion circuit 80 constituted by a step-down converter. The output voltage of the DC voltage conversion circuit 80 is supplied to the power storage device 70 and the load 42. The step-down ratio of the step-down converter is adjusted by the pulse width of the control pulse signal applied to the step-down converter.

(Example 6 of Controlling Resonance Current i2)

As the power storage device 70 of the load circuit 40 is charged, the electric power required by the load circuit 40 changes with the elapse of time. Therefore, the control means 60 calculates the electric power required by the electric storage device 70 by measuring the voltage charged in the power storage device 70 by the charge voltage sensor 64. Then, the target value of the charging power of the power storage device 70 is changed according to the voltage charged in the power storage device 70. In this way, the control means 60 controls the voltage charged in the power storage device 70 to an appropriate value.

Third Embodiment

Third embodiment of the present invention will be described with reference to FIG. 5. The third embodiment is different from the previously described embodiments in that a transformer circuit is set at the first unit in the load circuit 40 instead of the DC voltage conversion circuit 80 in the previous described embodiments. The transformer circuit is composed of a primary coil L3 and a secondary coil L4. The secondary coil L4 is connected to a resonance capacitance C4 of a secondary resonant circuit. The input terminal of the rectifier circuit 41 is connected in series to the secondary resonant circuit.

The power transmitter circuit 10 of the present embodiment is similar to that of the first embodiment. In the power reception circuit 20, the primary coil L3 of the load circuit 40, the power receiving coil current control circuit 50, and the power receiving resonant circuit are connected in series similarly to the first embodiment.

(Power Reception Circuit 20)

As shown in FIG. 5, the power reception circuit 20 has a power receiving resonant circuit that has a resonance capacitance C2 and a power receiving coil 2 that has self inductance L2 and the power receiving coil current control circuit 50 and the primary coil L3 in series. The primary coil L3 is a part of the load circuit 40. Port 2 (P2) is a connecting point of the set of the power receiving coil current control circuit 50 and the primary coil L3 in series to the power receiving resonant circuit.

(Transformer Circuit in the Load Circuit 40)

The transformer circuit of the first unit in the load circuit 40 has the primary coil L3 of self-inductance L3 at the input terminal side, and has the secondary coil L4 of self-inductance L4 at the output terminal side. The secondary coil L4 is inductively coupled with the primary coil L3 by mutual inductance Mt. A secondary resonant circuit is constituted by the secondary resonance capacitance C4 and the secondary coil L4 connected in series. The resonance frequency of the resonance current i4 in the secondary resonant circuit is set to the same resonance frequency as that of the power receiving resonant circuit.

(Resonant Transformer Type Transformer Circuit)

As an example, the transformer circuit can be constituted by a resonant transformer type transformer circuit in which the circuit composed of a leakage inductance of the primary coil L3 and the leakage inductance of the secondary coil L4 and the secondary resonance capacitance C4 are connected in series. The circuit resonates at the same frequency as that of the power receiving resonant circuit.

(Modified Example 3) Transformer Circuit can be an Immittance Conversion Circuit As an example, the transformer circuit can be an immittance conversion circuit that has the following configuration. That is, the total inductance of the self-inductance L2 of the power receiving coil 2 and the self inductance L3 of the primary coil L3 of the transformer circuit resonate with the resonance capacitance C2 at the resonant frequency of the power receiving resonant circuit.

Self-inductance L4 of the secondary coil L4 of the transformer circuit resonates with the secondary resonance capacitance C4 by the resonant frequency as same as that of the power receiving resonant circuit. The secondary coil L4 is inductively coupled with the primary coil L3 of the power receiving resonant circuit. This transformer circuit is an immittance conversion circuit in which the impedance viewed from the primary side of this circuit is proportional to the admittance viewed from the secondary side of the circuit connected to the secondary side of this circuit. The transformer circuit can be constituted by another type immittance conversion circuit. For example, an immittance conversion circuit of a T-type circuit in which one capacitance is connected in the middle of two coils (inductors) for the transformer circuit.

The input terminal of the rectifier circuit 41 is connected to the secondary resonant circuit of the transformer circuit in series. The output terminal of the rectifier circuit 41 is connected to the power storage device 70. The rectifier circuit 41 supplies power to the power storage device 70 and the load 42 and the power receiving coil current control circuit 50, the power charges the power storage device 70 and be consumed by the load 42 and the power receiving coil current control circuit 50. The power reception circuit 20 can have a circuit in which the input terminal of the rectifier circuit 41 is connected in parallel to the secondary resonance capacitance C4 of the secondary resonant circuit, similarly to the second embodiment.

(Receiving Coil Current Control Circuit 50)

As in the first embodiment, the receiving coil current control circuit 50 controlled by the control means 60 serially applies the train of pulse-like voltage waveform Vp to the power receiving resonant circuit repeated at the same cycle as the resonance current i2. The train of pulse-like voltage waveform Vp controls the resonance current i2 in the power receiving resonant circuit.

(Control of Resonance Current i2)

The control means 60 sets the target value of the resonance current i2 and controls the receiving coil current control circuit 50 to control the resonance current i2 to adjust to the target value. Thereby the receiving coil current control circuit 50 controls the resonance current i2 to be constant and controls the voltage induced on the secondary coil L4 by the magnetic field generated by the resonance current i2 to be constant. The induced voltage is applied to the rectifier circuit 41 connected in series to the secondary resonant circuit so that the DC voltage generated at the output terminal of the rectifier circuit 41 becomes constant and the DC voltage is supplied to the power storage device 70.

That is, when voltage on the power receiving coil 2 induced by current in the power transmitting coil 1 changes due to shift of the position of the power receiving coil 2 facing the power transmitting coil 1, the control means 60 controls the power receiving coil current control circuit 50 to control the resonance current i2 in the power receiving resonant circuit to a constant value. The voltage induced to the secondary coil L4 of the transformer circuit becomes constant, and as a result, a constant DC voltage is supplied to the power storage device 70. Therefore, the voltage supplied to the power storage device 70 does not change and is stabilized.

Therefore, when the AC induced voltage on the power receiving coil 2 induced by current in the power transmitting coil 1 changes due to shift of the position of the power receiving coil 2 facing the power transmitting coil 1, the rectifier circuit 41 supplies stable constant voltage to the power storage device 70. Thereby, there is an effect that the charging to the power storage device 70 from the rectifier circuit 41 is stably continued.

Fourth Embodiment

The fourth embodiment is different from the above-described embodiment in that the receiving coil current control circuit 50 applies sine wave voltage Va in series to the power receiving resonant circuit to controls the resonance current i2 of the power receiving resonant circuit.

FIG. 6 shows a circuit configuration of the power receiving coil current control circuit 50 in the power reception circuit 20 of the fourth embodiment. Other circuit configurations are similar to that of the previously described embodiments. That is, the power transmitter circuit 10, the power receiving resonant circuit of the power reception circuit 20, the control means 60 that controls the power receiving coil current control circuit 50 of the power reception circuit 20, and the load circuit 40 are circuits shown in FIG. 1, FIG. 4, and FIG. 5.

(Receiving Coil Current Control Circuit 50)

The power receiving coil current control circuit 50 of the fourth embodiment is composed of an AC drive voltage supply 53 and a semiconductor switching element 52. The control means 60 switches the semiconductor switching element 52 of the receiving coil current control circuit 50 by the switch control signal sig1 to apply a train of the sine wave voltage Va in series to the receiving resonant circuit during the switch control signal sig1 is on. This controls the resonance current i2 of the power receiving resonant circuit. Further, a drive voltage sensor 65 can be installed for measuring AC voltage waveform of the output of the AC drive voltage supply 53.

(Control Means 60)

The control means 60 controls the AC frequency of the AC drive voltage supply 53 of the power reception coil current control circuit 50 with the AC frequency control signal sig2. The control means 60 receives the data of the AC voltage of the induced voltage on the power receiving coil 2 from the AC voltage sensor 62. The AC voltage is regarded as same as the voltage measured by the AC voltage sensor 62. The control means 60 controls the phase of the sine wave voltage Va of the AC drive voltage supply 53 to synchronize to the peak timing of the AC voltage measured by the AC voltage sensor 62.

The train of the sine wave voltage Va is synchronized with the AC voltage measured by the AC voltage sensor 62 as follows. The control means 60 receives the waveform data of the sine wave voltage Va of the AC drive voltage supply 53 measured by the drive voltage sensor 65. The control means 60 compares the sine wave voltage Va with the AC voltage measured by the AC voltage sensor 62.

When the phase of the sine wave voltage Va deviates from the phase of the AC voltage measured by the AC voltage sensor 62, the control means 60 controls the AC drive voltage supply 53 by the AC frequency control signal sig2 to shift the frequency of the sine wave voltage Va from the frequency of the AC voltage so that the phase difference between the sine wave voltage Va and the AC voltage will reduce as time passes.

When the phase of the sine wave voltage Va matches the phase of the AC voltage measured by the AC voltage sensor 62, then the control means 60 controls the AC drive voltage supply 53 by the AC frequency control signal sig2 to match the frequency of the sine wave voltage Va to the frequency of the AC voltage. Therefore, the frequencies and phases of the sine wave voltage Va and the AC voltage match.

When the AC induced voltage on the power receiving coil 2 induced by current in the power transmitting coil 1 is low, increasing rate of the resonance current i2 is gentle. Then the sine wave voltage Va is higher than the AC induced voltage on the power receiving coil 2. In that case, the control means 60 set on the switch control signal sig1. Then the semiconductor switching element 52 of the receiving coil current control circuit 50 is set on to start to add a train of the sine wave voltage Va onto the AC induced voltage on the power receiving coil 2 induced by current in the power transmitting coil 1. That accelerates the rate of increase of the resonance current i2, and controls to increase the resonance current i2 to the value of the predetermined steady current quickly.

(Control of Resonance Current i2)

The control means 60 receives data of the current waveform of the resonance current i2 measured by the resonance current sensor 61. When the amplitude of the resonance current i2 reaches the target value, the control means 60 set off the switch control signal sig1 to set off the semiconductor switching element 52 to stop applying the train of the sine wave voltage Va on the power receiving resonant circuit. Thereafter, the resonance current i2 is maintained at the target value.

It should be noted that the present invention is not limited to the embodiments described above, and may be applied to a wireless power transmission system having a power transmitting coil 1 for generating a magnetic field with alternating current and a power receiving coil 2, in which the AC induced voltage is induced by the current in the power transmitting coil 1. The wireless power transmission system has a power receiving resonant circuit constituted by the power receiving coil 2 and a resonance capacitance C2, control means 60 and a receiving coil current control circuit 50 controlled by the control means 60, they control the resonance current i2 in the power receiving resonant circuit to the target value. The wireless power transmission system increases the resonance current i2 by supplying power to the power receiving resonant circuit by the receiving coil current control circuit 50 whose power is supplied by the load circuit. The power receiving resonant circuit supplies power to the load circuit 40.

What is claimed is:

1. A wireless power transmission system, comprising:
   a power transmitting coil for generating a magnetic field with an alternating current;
   a power receiving coil for generating an induced voltage by electromagnetic induction of the power transmitting coil;
   a power supply circuit that supplies electric power to the power transmitting coil;
   a power receiving resonant circuit formed by connecting a resonance capacitance to the power receiving coil;
   a control operation unit for controlling to adjust resonance current that flows through the resonant circuit to a target value;
   a power receiving coil current control circuit having a DC power source that produces the periodical voltage and a switch, a switching timing of the switch being provided by the control operation unit, so that the resonance current is increased by supplying electric power to the power receiving resonant circuit under the control of the control operation unit; and
   a load circuit configured to receive electric power from the resonant circuit, the load circuit having a power storage device;
   wherein the power supply circuit supplies electric power to the power transmitting coil by flowing electric current through the power transmitting coil;
   induced voltage is generated in the power receiving coil by electromagnetic induction of a magnetic field generated by the power transmitting coil;
   the power receiving coil receives electric power by flowing electric current through the power receiving coil caused by the induced voltage
   the load circuit receives the electric power by passing the electric current from the power receiving coil through the load circuit;
   the power storage device of the load circuit supplies the electric power to the power receiving coil current control circuit; and the power receiving coil current control circuit is connected in series to the power receiving resonant circuit and applies a periodical voltage to the power receiving resonant circuit and thereby increases the electric power of the power receiving resonant circuit.

2. The wireless power transmission system according to claim 1, wherein the load circuit is directly connected to the power receiving coil current control circuit.

* * * * *